O. T. HUNGERFORD.
ELECTRIC CONDUIT.
APPLICATION FILED SEPT. 10, 1906.
1,017,759.
Patented Feb. 20, 1912.
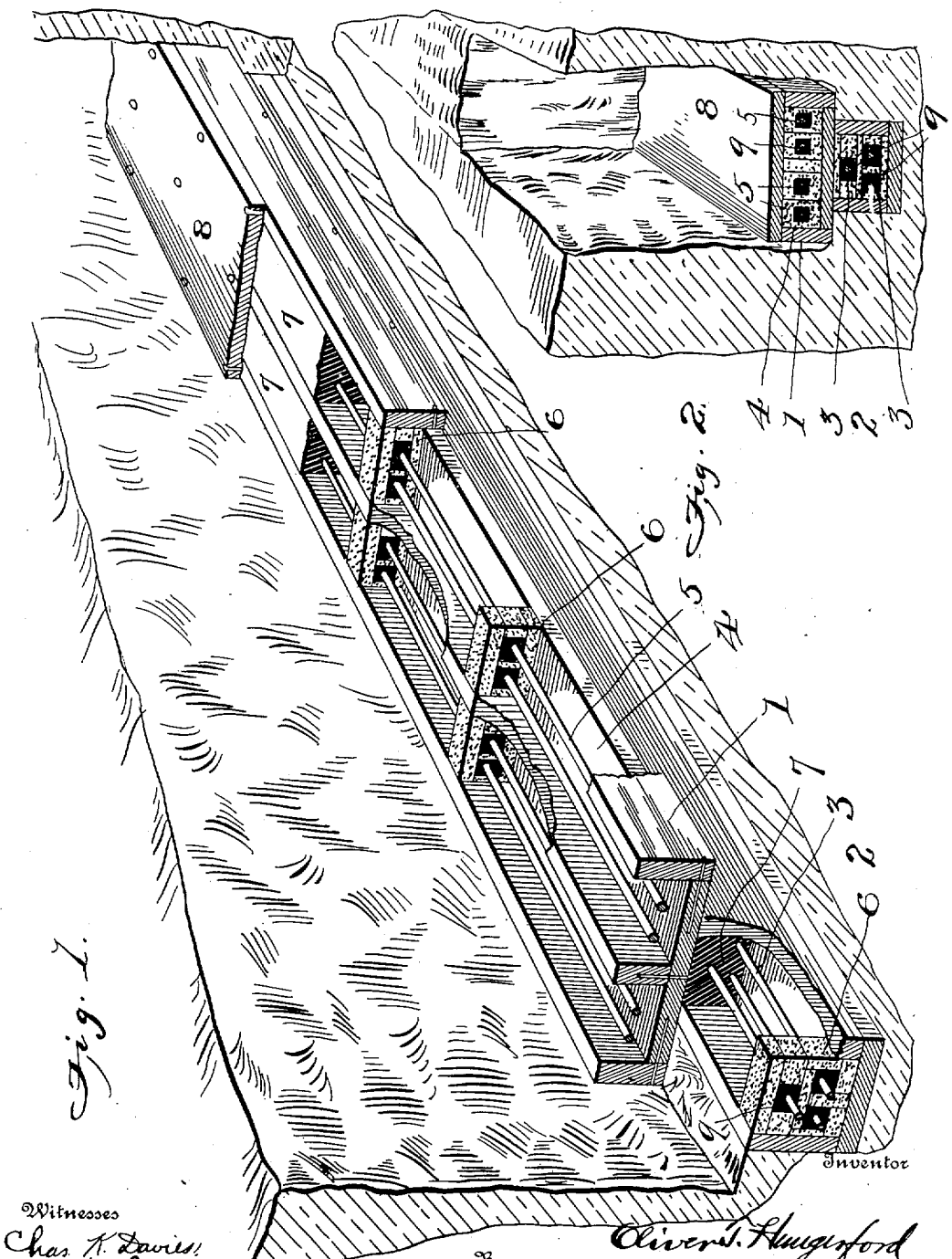
Witnesses
Chas. K. Davies
M. W. Darq
Inventor
Oliver T. Hungerford
By
A. W. Bedford
Attorney

UNITED STATES PATENT OFFICE.

OLIVER T. HUNGERFORD, OF BELLEVILLE, NEW JERSEY.

ELECTRIC CONDUIT.

1,017,759.   Specification of Letters Patent.   Patented Feb. 20, 1912.

Application filed September 10, 1906. Serial No. 333,955.

*To all whom it may concern:*

Be it known that I, OLIVER T. HUNGERFORD, a citizen of the United States, residing at Belleville, in the county of Newark and State of New Jersey, have invented certain new and useful Improvements in Electric Conduits, of which the following is a specification.

This invention relates to conduits particularly designed for electric conductors laid to transmit electricity under very high tension for power or lighting purposes, but which, of course, are also desirable for wires and cables laid to conduct electricity under ordinary tensions for lighting and power purposes and for telegraphic, telephonic and signaling purposes.

The object of this invention is to provide a conduit for such purposes which is simple and cheap to construct, which will always remain tight and completely protect the conductors so as to eliminate the danger of leakage of current. This conduit has a case and wires or cables strung in the case and supported and entirely surrounded by a bedding which completely fills the case and is practically homogeneous, and has substantially the same dielectric capacity throughout the entire length of the conduit, but which at regular intervals has short sections of greater density than the longer intermediate sections.

Figure 1 of the accompanying drawings is a perspective view of a conduit embodying the invention laid in the earth and having different portions removed in order to show the construction; and Fig. 2 is a transverse section taken through the earth and the conduit.

The case of this conduit may be built with any desired number of channels for the conductor or conductors, of wood (iron, or cement or any kind of material that is cheap and suitable to be laid in the ground or wherever the conductor is to be used.

The case of the conduit shown in the drawings is formed of pieces of plank 1 spiked together with a single channel 2 at the bottom, containing three conductors 3, and two channels 4 at the top, each containing two conductors 5. These conductors are usually single wires but may, of course, be cables. The conductors are first laid upon and secured in position by bridge-blocks 6 which are sufficiently rigid to prevent the conductors from sagging to the bottom of the channel. A filling 7 of liquid, semi-liquid or plastic insulating substance is then put about the conductors between the bridge-blocks until the channels are completely filled, after which the top 8 is fastened in position. The filling is made of resinous, bituminous or any dielectric substances, and the bridge-blocks are made of fibrous material, such as felt saturated with the same substances and may be hardened somewhat by drying to a sufficient degree before being placed in position so that they will support the conductors and prevent them from sagging to the bottom of the channel when the filling is put about them between said bridge-blocks. In order that the insulating substance may be poured it is necesary to have it hot when put into the conduit, and under some conditions of weather, etc., the action of this heat may cause the blocks, (composed of flimsy fibrous material, such as felt, saturated with the same substance) to collapse before sufficient time will elapse to permit the substance to cool and harden sufficiently to support the wires itself. In order to stiffen said bridge-blocks and prevent them from collapsing under the heat of the substance with which the spaces between them are filled, or the varying tension of the conductors, I embed a block 9 of hard substance, such as porcelain, therein at each point where one of the conductors is to pass through them. Said blocks 9 are formed with perforations to accommodate said conductors, which are thus firmly supported. Under such conditions these blocks 9 may not be required, but in most cases they will be found of advantage.

As the bridge-blocks which are first placed in the channels to support the conductors are of the same substance, although in a different condition, as the filling there is cohesion between the surface of the bridge-blocks and the filling so that no spaces, fissures or cracks will occur in the interior between the bridge-blocks and the filling into which moisture could collect and facilitate the escape or leakage of current, after the filling has become set. The expansion, contraction and hygroscopic capacity of the filling and bridge-blocks under temperature changes, and under varying conditions of moisture will be the same so there is no danger of rupture. When the filling and bridge-blocks are made of substantially the same substance or substances which have substantially the same dielectric capacity, the static effect of the bed throughout the entire length of the conduit is the same. With filling of a different substance than the bridge-blocks, there is less cohesion between the filling and the bridge-blocks and the different actions of the substances under varying changes in the conditions of temperature and moisture produce spaces, cracks and fissures in the material in which moisture is liable to collect and deleteriously affect the insulation and cause leakage from the wires. Static discharges resulting when there are currents of high tension in the conductors are liable to take place between different substances and rupture the material or at least to materially affect the flow of current. This is particularly so if porcelain, glass or other similar vitreous substances are employed for entirely forming the bridge-blocks of conduits which contain conductors for high tension power currents.

Where the bridge-blocks and the filling are substantially the same substances or of substances having the same dielectric capacities there is less static interference with the flow of current through the conductors.

Having thus fully described my said invention, what I claim as new and desire to secure by Letters Patent, is:—

1. An electric conduit comprising a casing having a channel containing an electric conductor supported at intervals by cross supports or bridge-blocks of fibrous material saturated with a plastic non-conducting substance, and having hard blocks embedded therein immediately surrounding the conductor, the spaces of said channel between said bridge-blocks or supports being filled with a similar plastic non-conducting substance as that with which said bridge-blocks are saturated, substantially as set forth.

2. A subterranean conduit consisting of a case, having a channel containing an electric conductor supported at intervals by fibrous material saturated with a bituminous compound, and a non-friable bituminous compound of substantially the same nature as that occupying the interstices of the fiber supports surrounding the conductor and filling the channel between the supports and uniting with the matter occupying the interstices of the fiber supports.

In witness whereof, I have hereunto set my hand and seal at Washington, D. C., this 7th day of September, A. D. nineteen hundred and six.

OLIVER T. HUNGERFORD. [L. S.]

Witnesses:
   E. W. BRADFORD,
   CHAS. E. RIORDON.